United States Patent [19]

Hamaguchi et al.

[11] Patent Number: 5,185,039
[45] Date of Patent: Feb. 9, 1993

[54] HYDRAULIC COMPOSITION

[75] Inventors: Tetsuo Hamaguchi, Chigasaki; Tsunehisa Ueda, Zushi; Tadao Natsuume, Yokosuka, all of Japan

[73] Assignee: Nippon Zeon Co., Ltd., Tokyo, Japan

[21] Appl. No.: 382,772

[22] Filed: Jul. 20, 1989

Related U.S. Application Data

[60] Division of Ser. No. 249,248, Sep. 26, 1988, Pat. No. 4,883,535, which is a continuation of Ser. No. 50,338, May 18, 1987, abandoned.

[30] Foreign Application Priority Data

| Date | Country | No. |
|---|---|---|
| May 20, 1986 | [JP] Japan | 61-115635 |
| Jul. 31, 1986 | [JP] Japan | 61-181140 |
| Jul. 31, 1986 | [JP] Japan | 61-181141 |
| Aug. 15, 1986 | [JP] Japan | 61-191528 |
| Sep. 30, 1986 | [JP] Japan | 61-232779 |
| Sep. 30, 1986 | [JP] Japan | 61-232780 |

[51] Int. Cl.$^5$ ............................................. C04B 7/00
[52] U.S. Cl. ............................................ 106/728; 106/711
[58] Field of Search ................ 106/90, 91, 92, 93, 106/85, 728

[56] References Cited

U.S. PATENT DOCUMENTS

| | | | |
|---|---|---|---|
| 4,317,681 | 3/1982 | Beede et al. | 106/85 |
| 4,324,591 | 4/1982 | Beede et al. | 106/85 |
| 4,778,529 | 10/1988 | Barker et al. | 106/93 |

*Primary Examiner*—Mark L. Bell
*Assistant Examiner*—Alan Wright
*Attorney, Agent, or Firm*—Sherman and Shalloway

[57] ABSTRACT

A hydraulic composition comprises a hydraulic component and an organic hydrogel, and optionally aggregate, a reinforcing material and other additives and has a slump value, determined by the testing method of JIS A1101, of not more than about 1 cm in a concrete formulation and a flow value, determined by the testing method of JIS R5201, of not more than about 120 mm in a mortar or paste formulation.

7 Claims, No Drawings

HYDRAULIC COMPOSITION

RELATED CASES:

This application is a divisional application of U.S. Ser. No. 07/249,248 filed Sep. 26, 1988, now U.S. Pat. No. 4,883,535, which in turn is a continuation of U.S. Ser. No. 07/050,338, filed May 18, 1987, now abandoned.

This invention is a novel dry hydraulic composition, and more specifically, a dry hydraulic composition containing a hydraulic component and an organic hydrogel and optionally, aggregate, a reinforcing material and other additives and a process for producing a hardened product which comprises compressing the hydraulic composition, molding it by vibration or application of a centrifugal force, etc. and then hardening it.

In hardening a hydraulic component such as cement and gypsum, it is the usual practice to knead it with water and optionally aggregate and a reinforcing material to form a slurry before it is actually applied. In order to improve the kneadability of the aqueous slurry and its workability at the time of application, water is used at this time in an amount much larger than the amount, calculated from stoichiometric proportions, of water which the hydraulic component requires. This method, however, has various problems, such as a reduction of strength, an increase of bleeding water, a generation of sludge at the time of centrifugal molding, and a reduction of thawing resistance caused by the unhydrated water after setting.

When gypsum is used as the hydraulic component, hardening of gypsum mixed with water begins rapidly. When it is used as an ordinary slurry, the time within which it can be cast is as short as 5 to 10 minutes, and it must be processed within a short period of time. This method also requires a drying step for evaporating the excess of water.

Furthermore, since the viscosity of the aqueous slurry is low, aggregate, reinforcing material, etc., are difficult to disperse uniformly in the slurry because of the difference in specific gravity between the aqueous slurry and the aggregate, the reinforcing material, etc. Thus, in order to ensure uniform mixing by using water in an amount required to harden the hydraulic binder in the production of building boards, there was proposed a method in which the mixing is carried out in a substantially dry condition using crushed ice or water frozen in snow form instead of water (Japanese Patent Publication No. 5694/1978). Recently, there was proposed a method in which the amount of water is decreased by using crushed ice instead of water in the production of concrete (Research Report of Tokai Chapter of Japanese Society of Architecture, February 1986, page 41).

According to these methods, however, the temperature of the materials and the temperature of the environmental atmosphere should be controlled so as not to permit melting of ice during kneading. Furthermore, since the particle diameter of ice has much to do with the uniform mixability of the hydraulic component with ice, the particle diameter of ice should be controlled until the kneading is over, and the ice must also be controlled before the kneading. When the mixture is hardened while the ice still remains, those parts of the resulting hardened product which are occupied by the ice are liable to become voids and reduce the strength of the hardened product. Hence, the production of the hardened product requires a different control from that in the prior art, and is unsuitable for industrial practice. Moreover, since the kneaded mixture has a low temperature in the production of products in factories, hardening of the hydraulic component is retarded and the productivity is reduced.

On the other hand, a technique of adding a highly water-absorbing resin to a cement mixture is known (for example, Japanese Laid-Open Patent Publications Nos. 69257/1981 and 141450/1984). This technique is intended to reduce the effect of water in the cement mixture by causing a highly water-absorbing resin to absorb water existing in a large amount in the cement mixture.

A technique of using a hydrogel as a source of supplying water has been quite unknown in the past.

The present inventors have made extensive investigations in order to solve the above problems of the prior art. These investigations have now led to the discovery that mixing in a dry condition using an organic hydrogel as a source of water supply can give a uniform kneaded mixture of a hydraulic component having excellent dispersibility, and increase its pot life, and that the resulting kneaded mixture can be hardened with a small amount of water to give a hardened product having high strength.

Thus, according to this invention, there is provided a dry hydraulic composition comprising a hydraulic component and an organic hydrogel and optionally aggregate, a reinforcing material and other additives.

The hydraulic component used in this invention denotes an inorganic material which hardens by hydration reaction. Specific examples include cements such as ordinary portland cement, high early strength portland cement, moderate heat-of-hardening portland cement, alumina cement, fly ash cement, blast furnace cement, silica cement, slag cement, and various mixed cements; and hemihydrate gypsum (obtained by dehydrating dihydrate gypsums such as natural gypsum, gypsum as a by-product of phosphoric acid production, gypsum as a by-product of titanium production, and gypsum resulting from desulfurization of discharged smoke). The hydraulic component used in this invention also embraces blast furnace slag and siliceous materials such as fly ash and brick scraps which harden in the presence of an alkali stimulating agent.

The organic hydrogel used in this invention may be any gel-like organic material which holds large amounts of water, for example, 5 to 1000 times, preferably 10 to 800 times, its own weight of water. Specific examples include hydrogels obtained by water absorption of highly water-absorbing polymers such as starch/acrylonitrile graft copolymer, carboxymethyl cellulose, polyacrylonitrile, polyethylene oxide, vinyl acetate/acrylic acid salt copolymer, vinyl alcohol/acrylic acid salt copolymer, polyacrylic acid salts and olefin/maleic anhydride copolymers; and hydrogels obtained by reacting poly(carboxylic acid salts) such as poly(acrylic acid salts) and salts of olefin/maleic anhydride copolymers with crosslinking agents in the presence of water.

The type of such a highly water-absorbing resin is not particularly restricted, and those which are generally commercially available can be used.

The amount of the organic hydrogel to be mixed is usually that which can supply water to be used. It is properly selected depending upon the required properties of the final product or its use. Preferably, the amount of the organic material constituting the hydrogel is limited to not more than 5 parts by weight per 100 parts by weight of the hydraulic component. The organic hydrogel is in the form of, for example, particles, plates or rods. Its form is not restricted by the method of use, but in view of the ease of mixing, it is preferably in a particulate form.

Water to be used is not particularly restricted. Usually, city water, underground water and sea water may be used.

The water content of the hydraulic composition of this invention is limited in order to maintain a dry condition. The water content differs depending upon the materials used, their proportions, temperature, etc. and cannot be generalized. The upper limit of the water content is usually one in which the slump value is not more than about 1 cm (by the testing method of JIS A 1101) in a concrete formulation, and one in which the flow value is not more than about 120 mm (by the testing method in JIS R 5201) in a mortar or paste formulation. Specifically, an ordinary concrete formulation comprising ordinary portland cement, crushed stones and river sand has a water content of not more than about 150 kg/m$^3$. A mortar formulation with a cement/sand ratio of $\frac{1}{3}$ has a water/cement ratio of not more than about 0.4. When the hydraulic component is gypsum, the amount of water used is not more than 50% by weight, preferably not more than 40% by weight, based on the gypsum. There is no lower limit to the amount of water used. Usually, however, the amount of water is at least 3% by weight, preferably at least 10% by weight, based on the hydraulic component. The lower limit of the amount of water is much smaller than the stoichiometric proportion of the hydraulic component, but since the hydraulic component gradually forms a hydrate, a cured product can be produced from it with a small amount of water if during the aging period, required water is supplied from outside.

In addition to the hydraulic component and the organic hydrogel as essential ingredients, the composition of this invention may optionally contain aggregate, reinforcing materials and other additives usually employed in the art. Specific examples of the aggregate are sand, gravel, lightweight aggregate for example, sawdust, expanded perlite, calcined vermiculite, foamed polyurethane, foamed polystyrene, resinous microballoons (such as microballoons of phenolic resins, polyvinylidene chloride and epoxy resin), inorganic microballoons (volcanic rocks, silica sand, and sodium silicate)], weighting materials (steel balls and baryte), clays, bentonite and lime. When gypsum is used as the hydraulic component, the lightweight aggregate is preferably an inorganic microballoon.

Specific examples of the reinforcing materials include pulp fibers, glass fibers, rockwool, resin fibers, carbon fibers, aramid fibers and metallic fibers.

The alkali stimulating agent used in this invention is a component necessary for blast furnace slag having latent hydraulic property or a siliceous material which undergoes pozzolan reaction to chemically react to form a hardened product. Specific examples are oxides and hydroxides of metals such as sodium, potassium, calcium, magnesium and aluminum, and portland cement which undergoes hydration reaction with water to form $Ca(OH)_2$. Slaked lime and portland cement are economically advantageous.

The amount of the alkali stimulating agent mixed may be one required for the hydraulic component to react, and is properly selected depending upon the required properties or uses of the final product. For example, in a combination of granulated blast furnace slag and slaked lime as the alkali stimulating agent, the amount of slaked lime is 0.5 to 20 parts by weight per 100 parts of the granulated blast furnace slag. In a combination of the granulated blast furnace slag and portland cement as the alkali stimulating agent, the amount of the portland cement is at least 1 part by weight per 100 pats by weight of the granulated blast furnace slag since the portland cement itself is hydraulic.

The siliceous material which undergoes pozzolan reaction such as fly ash is desirably mixed together with portland cement which undergoes hydration reaction to form $Ca(OH)_2$. The amount of the portland cement mixed for this purpose is at least 10 parts by weight but not exceeding 1,000 parts by weight per 100 parts by weight of the siliceous material. Larger amounts are not economically advantageous.

Usually employed dispersants may be incorporated in the composition of this invention. Inclusion of a dispersant in at least part of the organic hydrogel advantageously permits consolidation not only by an operation under low pressure but also by an operation of vibration or the like and thus gives a uniform hardened product.

The dispersants may be any of those used for hydraulic components such as cement and gypsum. Specific examples include water reducing agents, high-performance water reducing agents, and fluidizing agents, such as resin acid salts, ligninesulfonic acid salts, hydroxycarboxylic acid salts, polyol complexes, melamine sulfonic acid/formalin condensate or its salts, creosote oil sulfonic acid/formalin condensate or its salts, naphthalenesulfonic acid/formalin condensate or its salts, polycarboxylic acids or their salts.

The amount of the dispersant used is properly chosen according to its type or the properties required of the final product. Usually, it is 0.01 to 3% by weight, preferably 0.05 to 1% by weight, based on the hydraulic component as solids.

A hydrogel containing the dispersant may be obtained by, for example, causing an aqueous solution of the dispersant to be absorbed by a highly water-absorbing polymer, or reacting a polycarboxylic acid salt with a crosslinking agent in the presence of an aqueous solution of the dispersant. The amount of the organic hydrogel containing the dispersant may be one in which the amount of water to be used and the required amount of the dispersant can be supplied. It can be properly selected according to the required properties or uses of the final product.

The organic hydrogel containing the dispersant may at least partly contain the dispersant. The proportion of the organic hydrogel containing the dispersant in the entire organic hydrogel may be properly selected according to the type of the dispersant or the proportions of the materials used. In view of the properties of the final product, it is preferred to keep it at 30% by weight or more, especially 50% by weight or more.

Specific examples of the other additives include binders, air-entraining agents, cement wetting dispersants, expanding agents, water-proofing agents, strength increasing agents, setting accelerators, setting retarders, and thickeners. If possible, the additives are used preferably by including them in a highly water-absorbing resin beforehand.

The sequence of mixing the individual ingredients may be properly chosen depending upon the purpose for which the final product is used. Specifically, the hydraulic component and the organic hydrogel are mixed, and as required, the mixture is further mixed with aggregate, a reinforcing material and other additives; or the organic hydrogel is first mixed with aggregate, a reinforcing material and other additives, and then the mixture is further mixed with the hydraulic component; or all of the ingredients are mixed simultaneously. Usually, the mixing may be carried out by using a Hobart mixer (mixer equipped with a stirring-rod and capable of planetary motion), a tilted mixer, a forced-mixing type mixer and a pin mixer.

The resulting hydraulic dry composition is a mixture of solid particles unlike an ordinary slurry-like composition fluidized with water. There is no particular restriction on the method of hardening this composition. For example, press molding, vibration molding and centrifugal molding may be applied. Press molding is effected by filling the composition in a form and then pressing it.

Pressing may be carried out by using a press, a roller, etc. The pressure to be applied differs depending upon the hydraulic composition. Usually, it is at least 5 kg/cm$^2$, preferably at least 10 kg/cm$^2$. The time required for pressing varies depending upon the pressure applied, the formulation of the composition, etc. Usually, pressure is preferably continued for at least 30 seconds. Vibration molding is carried out by filling the composition in a form.

As required, the composition is removed from the form, and then aged. The method of aging is not particularly limited, and specific examples are underwater aging, aging in humid air, steam aging and autoclave aging.

Usually, during aging, water gradually oozes out from the hydrogel and hardening proceeds in the presence of this water. Where the amount of water in the hydrogel is less than the theoretically required amount of water for hardening, water must be supplied from outside in the stage of aging in order to obtain complete hardening.

The hardened product so obtained can be used in various applications. It is especially useful as building materials such as panels, cement tiles, paving blocks, slates, flooring materials and blocks. Hardened gypsum products may also be used as porcelains and works of arts and crafts.

Thus, according to the present invention, by using the organic hydrogel as a source of water supply, a dry hydraulic composition can be obtained which does not require complex temperature control, has good dispersibility, and can be hardened with a low water content to provide a hardened product having excellent quality.

The invention also has an advantage in regard to energy in that a drying step can be omitted in the production of gypsum products.

The following Examples and Referential Examples illustrate the present invention more specifically. Unless otherwise specified, all parts in these examples are by weight.

REFERENTIAL EXAMPLE 1

Hydrogels (I) to (III) were prepared by causing the highly water-absorbing resins indicated in Table 1 to absorb predetermined amounts of water. These hydrogels were in the form of particles each having a particle diameter of about 1 mm.

TABLE 1

| Hydrous gel | Highly water-absorbing resin | | Water (parts) |
|---|---|---|---|
| | Type | Amount (parts) | |
| (I) | Polyacrylic acid-type resin (*1) | 5 | 1500 |
| (II) | Starch-acrylic acid graft copolymer (*2) | 5 | 1500 |
| (III) | iso-Butylene/maleic acid copolymer (*3) | 5 | 1000 |

(*1): AQUALIC, a tradename for a product of Japan Catalytic Chemical Co., Ltd.
(*2): SANWET, a tradename for a product of Sanyo Chemical Co., Ltd.
(*3): KI GEL, a tradename for a product of Kuraray Isoprene Co., Ltd.

REFERENTIAL EXAMPLE 2

Seventy-three (73) parts of an 8% aqueous solution of polyethylene glycol diglycidyl ether (EPOLIGHT 400E, a tradename for a product of Kyoeisha Oils and Fats Chemical Industry Co., Ltd.) was added to 144 parts of an 8% aqueous solution of a sodium salt (neutralization degree 0.78) of isobutylene/maleic anhydride copolymer (ISOBAM 10, a tradename for a product of Kuraray Isoprene Chemical Co., Ltd.), and they were uniformly mixed. The mixture was poured into a stainless steel vessel and the vessel was sealed up to prevent water evaporation and heated for 2 hours in an oven at 60° C. to perform crosslinking reaction. The resulting hydrogel (IV) was in the shape of a rectangle having a size of 50×50×10 mm.

EXAMPLE 1

In each run, 1,500 g of cement (Asano ordinary portland cement), 1,500 g of sand (Toyoura standard sand) and each of the hydrogels (I) to (IV) in an amount corresponding to each of the amounts of water indicated in Table 2 were mixed for 3 minutes by a Hobart mortar mixer. The flow value of the mixture was measured in accordance with JIS R 5201. The results are shown in Table 2. The mixture was then filled in a mortar form having a size of 5 cm diameter ×10 cm), and a predetermined pressure indicated in Table 2 was applied to it for 5 minutes to produce a molded article. The molded article was aged overnight in humid air at 20° C., and its upper surface was finished in accordance with JIS A 1132. The molded article was then removed from the form, and aged in water at 20° C. for a predetermined period of time. The compression strength of the resulting hardened product was measured in accordance with JIS A 1108.

For comparison, the above procedure was repeated except that water was used in the same amount as contained in the hydrogel instead of the hydrogel, and the pressuring operation was omitted. The compression strength of the resulting hardened product was measured.

The results are shown in Table 2.

TABLE 2

| Run No. | Hydrogel | Water content (g) | W/C(*) (parts) | Flow value (mm) | Pressure (kg/cm$^2$) | Compression strength (kg/cm$^2$) | | |
|---|---|---|---|---|---|---|---|---|
| | | | | | | 3 days | 7 days | 28 days |
| Invention | | | | | | | | |
| 1-1 | (I) | 375 | 25 | No flowing | 100 | 561 | 642 | 711 |
| 1-2 | (I) | 525 | 35 | 118 | 10 | 390 | 478 | 603 |

TABLE 2-continued

| Run No. | Hydrogel | Water content (g) | W/C(*) (parts) | Flow value (mm) | Pressure (kg/cm$^2$) | Compression strength (kg/cm$^2$) 3 days | 7 days | 28 days |
| --- | --- | --- | --- | --- | --- | --- | --- | --- |
| 1-3 | (II) | 375 | 25 | No flowing | 100 | 550 | 640 | 712 |
| 1-4 | (III) | 375 | 25 | No flowing | 100 | 555 | 645 | 700 |
| 1-5 | (IV) | 375 | 25 | No flowing | 100 | 565 | 648 | 718 |
| Comparison | | | | | | | | |
| 1-6 | — | 525 | 35 | 125 | A uniform molded article was not obtained, and strength measurement was impossible. | | | |
| 1-7 | — | 600 | 40 | 200 | — | 303 | 405 | 541 |

(*): Amount of water per 100 parts of cement

The results demonstrate that the hydraulic composition of this invention can be hardened with a low water content, and the resulting hardened product has very high strength.

EXAMPLE 2

In each run, Example 1 was repeated except that 1,000 g of cement, 2,000 g of sand and each of the hydrogels shown in Table 3 in an amount corresponding to each of the amounts of water indicated in Table 3 were used instead of the materials used in Example 1.

For comparison, the above procedure was repeated except that water was used in the same amount as contained in the hydrogel instead of the hydrogel and the pressurizing operation was omitted.

The results are shown in Table 3.

TABLE 3

| Run No. | Hydrogel | Water content (g) | W/C (*) (parts) | Flow value (mm) | Pressure (kg/cm$^2$) | Compression strength (kg/cm$^2$) 3 days | 7 days | 28 days |
| --- | --- | --- | --- | --- | --- | --- | --- | --- |
| Invention | | | | | | | | |
| 2-1 | (I) | 150 | 15 | No flowing | 400 | 375 | 522 | 692 |
| 2-2 | (I) | 200 | 20 | No flowing | 300 | 548 | 680 | 787 |
| 2-3 | (I) | 250 | 25 | No flowing | 200 | 530 | 613 | 677 |
| 2-4 | (I) | 300 | 30 | No flowing | 100 | 403 | 493 | 615 |
| 2-5 | (I) | 350 | 35 | 108 | 20 | 363 | 444 | 570 |
| 2-6 | (II) | 250 | 25 | No flowing | 200 | 532 | 615 | 680 |
| 2-7 | (III) | 250 | 25 | No flowing | 200 | 528 | 610 | 672 |
| 2-8 | (IV) | 250 | 25 | No flowing | 200 | 535 | 619 | 680 |
| Comparison | | | | | | | | |
| 2-9 | — | 400 | 40 | 114 | A uniform molded article was not obtained, and strength measurement was impossible. | | | |
| 2-10 | — | 450 | 45 | 150 | — | 238 | 341 | 458 |

(*): W/C is parts of water to 100 parts of cement.

The above results show that even when the proportion of the aggregate used is high, the composition can be hardened with a much lower water content than in the prior art, and the resulting hardened product has very high strength.

EXAMPLE 3

In each run, 1,000 g of cement, 2,000 g of sand, the hydrogel (I) in an amount corresponding to a water content of 250 g, and a predetermined amount of reinforcing fibers were mixed for 3 minutes by a Hobart mortar mixer. The mixture was filled in a mortar form (5 cm diameter ×10 cm), and by applying a pressure of 50 kg/cm$^2$ to it for 5 minutes, a molded article was produced. The molded article was aged overnight in humid air at 20° C., and removed from the form. The resulting hardened product was cut longitudinally, and the state of dispersion of the fibers at the cut section was observed.

For comparison, the above procedure was repeated except that 450 g of water was used instead of the hydrogel, and the pressurizing operation was omitted. The cut section of the hardened product was observed.

The results are shown in Table 4.

TABLE 4

| Run No. | Reinforcing material Type | Amount (g) | State of the fibers at the cut section |
| --- | --- | --- | --- |
| Invention | | | |
| 3-1 | Polyethylene fibers (*1) | 24 | Uniformly dispersed on the entire surface |
| 3-2 | Steel fibers (*2) | 210 | Uniformly dispersed on the entire surface |
| Comparison | | | |
| 3-3 | Polyethylene fibers | 24 | Concentrated on the upper portion |
| 3-4 | Steel fibers | 210 | Concentrated on the lower portions |

(*1): BONFIX, a tradename for a product of Mitsui Petrochemical Industries, Ltd.
(*2): SHINKO FIBER, a tradename for a product of Kobe Steelmaking Co., Ltd.

It is seen from the results obtained that in the compositions of this invention, the reinforcing material having a difference in specific gravity can be uniformly dispersed and good hardened products with little separation of the reinforcing fibers can be obtained.

EXAMPLE 4

In each run, cement (Asano ordinary portland cement), coarse aggregate (crushed stones having a maximum diameter of 20 mm), occurring in Oume, Japan, fine aggregate (river sand occurring in Ooi River, Japan) and hydrogel (I) containing a predetermined amount of water were mixed in accordance with the formulation shown in Table 5 and then kneaded by a forced kneading mixer for 90 seconds. The slump of the mixture was measured in accordance with JIS A 1101. Thereafter, the mixture was filled in a concrete form having a size of 10 cm diameter ×20 cm, and a predetermined pressure as shown in Table 5 was applied to it to produce a molded article. The molded article was aged overnight in humid air at 20° C., and its upper surface was finished in accordance with JIS A 1132. The molded article was then removed from the form, and aged in water at 20° C. for a predetermined period of time. The compression strength of the resulting hardened product was measured in accordance with JIS A 1108.

For comparison, the above procedure was repeated except that water was used in the same amount as contained in the hydrogel instead of the hydrogel and the pressurizing operation was omitted.

The results are shown in Table 5.

TABLE 5

| Run No. | Hydrogel | Mixing C (parts) | Mixing W (parts) | W/C (parts) (**) | S/A (%) (*) | Slump (cm) | Pressure (kg/cm$^2$) | Compression strength (kg/cm$^2$) 7 days | Compression strength (kg/cm$^2$) 28 days |
|---|---|---|---|---|---|---|---|---|---|
| Invention | | | | | | | | | |
| 5-1 | (I) | 320 | 100 | 31 | 38 | No slump | 200 | 485 | 603 |
| 5-2 | (I) | 320 | 125 | 39 | 38 | No slump | 100 | 504 | 631 |
| 5-3 | (I) | 320 | 150 | 47 | 38 | 0.5 | 50 | 451 | 584 |
| Comparison | | | | | | | | | |
| 5-4 | — | 320 | 150 | 47 | 38 | 1.0 | A uniform molded article was not obtained, and strength measurement was impossible. | | |
| 5-5 | — | 320 | 160 | 50 | 38 | 6.3 | — | 334 | 472 |

(*): S/A is a percentage of volume of fine aggregate to volume of fine aggregate plus volume of course aggregate.
(**): W/C is parts of water to 100 parts of cement.

The above results demonstrate that the hydraulic composition of this invention can be hardened with a low water content even in the case of a concrete formulation, and the resulting hardened product has very high strength.

EXAMPLE 5

In each run, 1,500 g of calcined gypsum (made by Yoshino Gypsum Co., Ltd.) and each of the hydrogels (I) to (IV) in an amount corresponding to each of the amounts of water indicated in Table 6 were kneaded for 2 minutes by a Hobart mortar mixer. The mixture was left to stand for a predetermined period of time shown in Table 6, and filled in a form having a size of 4×4×16 cm. By applying a pressure of 15 kg/cm$^2$ for 5 minutes, it was molded and hardened. The hardened product was immediately removed from the form and its flexural strength and compression strength were measured in accordance with JIS R 5201.

For comparison, the above procedure was repeated except that water was used instead of the hydrogel, the pressurizing operation was omitted, and the gypsum slurry was heated in an oven at 60° C. for 10 minutes to obtain a hardened product.

The results are shown in Table 6.

TABLE 6

| Run No. | Hydrogel | Water/ gypsum (*) | Standing time after kneading (min.) | Compression strength (kg/cm$^2$) | Flexural strength (kg/cm$^2$) |
|---|---|---|---|---|---|
| Invention | | | | | |
| 6-1 | (I) | 18 | 2 | 99 | 41 |
| 6-2 | (I) | 18 | 30 | 103 | 40 |
| 6-3 | (I) | 18 | 60 | 95 | 44 |
| 6-4 | (I) | 25 | 2 | 86 | 35 |
| 6-5 | (I) | 35 | 2 | 80 | 33 |
| 6-6 | (II) | 18 | 2 | 97 | 39 |
| 6-7 | (III) | 18 | 2 | 100 | 43 |
| 6-8 | (IV) | 18 | 2 | 105 | 45 |
| Comparison | | | | | |
| 6-9 | — | 70 | 2 | 51 | 25 |
| 6-10 | — | 70 | 10 | Solidified and could not be poured into the form. | |

(*): Amount of water per 100 parts of gypsum.

It is seen from Table 6 that in the present invention, the pot life of the kneaded mixture increases greatly and it has excellent workability; that gypsum can be mixed with a low water content and the resulting hardened gypsum product has very high strength and high quality; and that the drying step required in the prior art can be omitted to provide process and energy advantages.

REFERENTIAL EXAMPLE 3

In each run, each of the dispersants indicated in Table 7 and water were mixed in predetermined amounts to prepare an aqueous solution of the dispersant. The aqueous solution was caused to be absorbed by a highly water-absorbing resin (AQUALIC, a tradename for a product of Japan Catalytic Chemical Co., Ltd.) to obtain each of hydrogels (V) to (IX). The resulting hydrogels were in the form of particles each having a particle diameter of about 1 mm.

TABLE 7

| Hydrous gel | Dispersant Type | Dispersant Amount (parts) | Water (parts) | Highly water-absorbing resin (parts) |
|---|---|---|---|---|
| (V) | Resin acid-type (*1) | 3 | 1497 | 7 |
| (VI) | Ligninsulfonate type (*2) | 15 | 1485 | 10 |
| (VII) | Naphthalenesulfonic acid/ formalin condensate salt (*3) | 20 | 1480 | 12 |
| (VIII) | Polycarboxylic | 15 | 1485 | 10 |

TABLE 7-continued

| Hydrous gel | Dispersant Type | Amount (parts) | Water (parts) | Highly water-absorbing resin (parts) |
|---|---|---|---|---|
| (IX) | acid salt (*4) Polycarboxylic acid salt (*4) | 25 | 1475 | 25 |

(*1): VINSOL, a tradename for a product of Yamaso Chemical Co., Ltd.
(*2): POZZOLITH No. 70, a tradename for a product of Nisso Master Builders Co.
(*3): MIGHTY 150, a tradename for a product of Kao Co., Ltd.
(*4): WORK 500, a tradename for a product of Nippon Zeon Co., Ltd.

REFERENTIAL EXAMPLE 4

Twenty parts of a 20% aqueous solution of polyethylene glycol diglycidyl ether (EPOLIGHT 400 E, a tradename for a product of Kyoei Oils and Fats Chemical Industry Co., Ltd.), 20 parts of "WORK 500" and 120 parts of water were added to 40 parts of a 20% aqueous solution of a sodium salt (neutralization degree 0.78) of isobutylene/maleic anhydride copolymer (ISOBAM 10, a tradename for a product of Kuraray Isoprene Chemical Co., Ltd.), and they were uniformly mixed. The mixture was poured into a stainless steel vessel. The vessel was sealed up so as to prevent water evaporation, and then heated in an oven at 60° C. for 2 hours to perform crosslinking reaction. The resulting hydrogel (X) was in the form of a rectangle having a size of $50 \times 50 \times 10$ mm.

EXAMPLE 6

In each run, 1,000 parts of cement (Asano ordinary portland cement), 2,000 parts of sand (Toyoura standard sand) and each of the hydrogels (V) to (X) in an amount to provide 250 parts of water were mixed for 3 minutes by a Hobart mortar mixer. The flow value of the mixture was measured in accordance with JIS R 5201. The results are shown in Table 2. The mixture was then filled in a mortar form having a size of 5 cm diameter $\times 10$ cm), and a predetermined pressure indicated in Table 8 was applied to it for 5 minutes to produce a molded article. The molded article was aged overnight in humid air at 20° C., and its upper surface was finished in accordance with JIS A 1132. The molded article was then removed from the form, and aged in water at 20° C. for a predetermined period of time. The compression strength of the resulting hardened product was measured in accordance with JIS A 1108.

For comparison, the above procedure was repeated using a hydrogel (XI) prepared by causing the highly water-absorbing resin (AQUALIC) to absorb water free from the dispersant to an absorption ratio of 300.

The results are shown in Table 8.

TABLE 8

| Run No. | Hydrogel | W/C(*) (parts) | Flow value (mm) | Pressure (kg/cm$^2$) | Compression strength (kg/cm$^2$) 3 days | 7 days | 28 days |
|---|---|---|---|---|---|---|---|
| Invention |
| 8-1 | (V) | 25 | No flowing | 130 | 525 | 610 | 672 |
| 8-2 | (VI) | 25 | " | 130 | 533 | 625 | 668 |
| 8-3 | (VII) | 25 | " | 130 | 540 | 642 | 688 |
| 8-4 | (VIII) | 25 | " | 130 | 538 | 630 | 671 |
| 8-5 | (X) | 25 | " | 130 | 528 | 602 | 665 |
| Comparison |
| 8-6 | (XI) | 25 | " | 200 | 530 | 613 | 677 |

(*): Amount of water per 100 parts of cement.

The results show that in the present invention, the hydraulic composition can be molded under a low pressure and hardened with a low water content, and a hardened product having high strength can be obtained.

EXAMPLE 7

A mortar obtained in accordance with Example 6 was filled in a mortar form having a size of 5 cm diameter $\times 10$ cm. The form was placed on a vibratory table with a vibration number of 3000 rpm and an amplitude of 1 mm (V-B consistometer, made by Tokyo Measuring Instrument Co., Ltd.), and by applying vibration for 2 minutes, the mortar was consolidated to a molded article. It was hardened as in Example 6, and the compression strength of the resulting hardened product was measured.

For comparison, the same operation was repeated using hydrogel (XI) containing no dispersant.

The results are shown in Table 9.

TABLE 9

| Run No. | Hydrogel | Water content (parts) | W/C (*) (parts) | Compression strength (kg/cm$^2$) 3 days | 7 days | 28 days |
|---|---|---|---|---|---|---|
| Invention |
| 9-1 | (V) | 300 | 30 | 403 | 493 | 615 |
| 9-2 | (VI) | 300 | 30 | 415 | 501 | 625 |
| 9-3 | (VII) | 300 | 30 | 420 | 522 | 638 |
| 9-4 | (VIII) | 300 | 30 | 418 | 517 | 630 |
| 9-5 | (X) | 300 | 30 | 408 | 505 | 611 |
| Comparison |
| 9-6 | (XI) | 300 | 30 | A dense solid molded article was not obtained, and strength measurement was impossible. | | |
| 9-7 | (XI) | 400 | 40 | 250 | 363 | 477 |

(*): W/C is parts of water to 100 parts of cement.

The results show that in the present invention, the hydraulic composition can be consolidated by a vibrator, and hardened with a low water content, and a hardened product having high strength can be obtained.

EXAMPLE 8

In each run, cement (Asano ordinary portland cement), coarse aggregate (crushed stones having a maximum diameter of 20 mm), fine aggregate (river sand occurring in Ooi River, Japan) and hydrogel (VII) were mixed in accordance with the formulation shown in Table 10 and then kneaded by a forced-mixing type mixer for 90 seconds. The slump of the mixture was measured in accordance with JIS A 1101. Thereafter, the mixture was filled in a centrifugal molding form having a size of 20 cm diameter $\times 30$ cm, and centrifugally molded for 4 minutes at 6 G and for 5 minutes at 20 G. Then, the amount of sludge generated was measured. After molding, the molded article was left to stand for 4 hours, heated to 75° C. over the course of 3 hours, maintained at this temperature for 4 hours, allowed to cool overnight, and then removed from the form. The product was then aged at room temperature for 7 days. The compression strength of the resulting hardened product was measured in accordance with JIS A 1108.

For comparison, a slurry composition was prepared using 1.5%, based on the amount of cement, of a high-performance water reducing agent (MIGHTY 150, a tradename for a product of Kao Co., Ltd.), and the same operation as above was carried out on this composition, and the amount of sludge generated and the compression strength of the hardened product were measured.

a Hobart mortar mixer. The mixture was filled in a form having a size of 4×4×16 cm, and molded and hardened by applying a pressure of 50 kg/cm² for 5 minutes. The hardened product was immediately removed from the form, and its density and compression strength (JIS R 5201) were measured.

For comparison, water was used in the same amount as contained in the hydrogel instead of the hydrogel, and by the same operation, the resulting gypsum slurry was poured into a form. It was heated in an oven at 60° C. for a predetermined period of time without a pressurizing operation. The density and compression strength of the resulting hardened product were measured.

The results are shown in Table 11.

TABLE 11

| Run No. | Hydrogel | Light-weight aggregate (g) | Water (g) | Water/gypsum (parts) (*) | Drying time (min.) | Hardened product Density (g/cm³) | Compression strength (kg/cm²) |
|---|---|---|---|---|---|---|---|
| Invention | | | | | | | |
| 11-1 | (I) | 50 | 100 | 20 | 0 | 1.29 | 99 |
| 11-2 | (I) | 100 | 100 | 20 | 0 | 1.05 | 91 |
| 11-3 | (I) | 150 | 100 | 20 | 0 | 0.87 | 83 |
| 11-4 | (II) | 150 | 100 | 20 | 0 | 0.88 | 84 |
| 11-5 | (III) | 150 | 100 | 20 | 0 | 0.85 | 80 |
| 11-6 | (IV) | 150 | 100 | 20 | 0 | 0.86 | 80 |
| Comparison | | | | | | | |
| 11-7 | (I) | — | 100 | 20 | 0 | 2.10 | 103 |
| 11-8 | — | — | 350 | 70 | 10 | 1.12 | 50 |
| 11-9 | — | 50 | 350 | 70 | Could not be molded because a slurry could not be prepared. | | |
| 11-10 | — | 50 | 500 | 100 | 30 | 0.90 | 32 |
| 11-11 | — | 100 | 500 | 100 | Could not be molded because a slurry could not be prepared. | | |
| 11-12 | — | 100 | 700 | 140 | 60 | 0.73 | 20 |

(*): Amount of water per 100 parts of gypsum.

The results are shown in Table 10.

TABLE 10

| | Hydrogel | Mixing C (parts) | Mixing W (parts) | W/C parts (*) | S/A (%) (*) | Slump (cm) | Amount of sludge generated (ml) | Compression strength (kg/cm²) |
|---|---|---|---|---|---|---|---|---|
| Invention | (VII) | 320 | 100 | 31 | 38 | No slump | None | 716 |
| Comparison | — | 480 | 149 | 31 | 38 | 12.2 | 80 | 637 |

(*): S/A is a percentage of volume of fine aggregate to volume of fine aggregate plus volume of course aggregate.
(**): W/C is parts of water to 100 parts of cement.

The results show that in the present invention, a dense solid molded product can be obtained by centrifugal molding while preventing generation of sludge during molding, and the resulting hardened product has very high strength.

EXAMPLE 9

Run No. 8-4 of Example 6 was repeated except that a 6:4 mixture of hydrogel (IX) containing the polycarboxylic acid-type dispersant and hydrogel (I) containing no dispersant was used instead of the hydrogel used in Run No. 8-4. Nearly the same results were obtained.

EXAMPLE 10

In each run, 500 g of calcined gypsum (made by Yoshino Gypsum Co., Ltd.), a predetermined amount of lightweight aggregate (silica balloons, 50% average particle diameter 48 microns; a product of Shikoku Kaken Industry Co., Ltd.) and each of the hydrogels (I) to (IV) in an amount corresponding to the amount of water shown in Table 11 were kneaded for 2 minutes by Cut sections of the resulting hardened products were observed. In the hardened products of the invention, the lightweight aggregate was uniformly dispersed throughout the hardened products, whereas the lightweight aggregate gathered locally in the upper portion in the hardened products of comparison (Runs Nos. 11-9 to 11-12).

The foregoing results demonstrate that in the present invention, the hydraulic component can be mixed with a low water content even when the amount of the lightweight aggregate is increased, and since the dispersibility of the lightweight aggregate is excellent, the resulting hardened products have very high strength, and lightweight gypsum products of high quality can be obtained. Furthermore, the drying step required in the prior art can be omitted, and this provides process and energy advantages.

EXAMPLE 11

Example 10 was repeated except that foamed polystyrene (made by Yuka Badische Co., Ltd.; expansion ratio 50; average particle diameter 0.5 mm) or GAROLITE (made by Shiraishi Industry Co., Ltd.; silica balloon; average particle diameter 250 micrometers).

The results are shown in Table 12.

When the cross sections of the hardened products in accordance with this invention were observed, the lightweight aggregate was uniformly dispersed throughout the hardened products.

The foregoing results demonstrate that the hydraulic composition of this invention can be hardened with a low water content even when granulated blast furnace slag is used as the hydraulic component, and the resulting hardened product has very high strength.

EXAMPLE 13

In each run, fly ash (see Table 14 below for its physi-

TABLE 12

| Run No. | Hydrogel | Light weight aggregate Type | Amount (parts) | Water (g) | Water/gypsum parts (*) | Hardened product Density (g/cm³) | Compression strength (kg/cm²) |
|---|---|---|---|---|---|---|---|
| Invention | | | | | | | |
| 12-1 | (I) | GAROLITE | 200 | 100 | 20 | 0.96 | 78 |
| 12-2 | (I) | Foamed polystyrene | 100 | 100 | 20 | 0.76 | 83 |
| Comparison | | | | | | | |
| 12-3 | (I) | — | — | 100 | 20 | 2.10 | 103 |

(**): Water/gypsum is parts of water to 100 parts of gypsum.

The foregoing results show that in the present invention, even when the type of the lightweight aggregate is changed, the dispersant is uniformly dispersed and lightweight gypsum products having high strength can be obtained.

EXAMPLE 12

Example 1 was repeated except that 1,500 g of granulated blast furance slag (CERAMENT, a product of Daiichi Cement Co., Ltd.), 75 g of cement, 1,575 g of sand, and each of the hydrogels indicated in Table 13 in an amount corresponding to each of the amounts of water indicated in Table 13 were used as the materials. The flow values of the cement mixtures and the compression strengths of the hardened products were measured.

For comparison, the above procedure was repeated except that water was used in the same amount as contained in the hydrogels instead of the hydrogels and the pressurizing operation was omitted.

The results are shown in Table 13.

cal and chemical properties), cement (Asano ordinary portland cement), sand (Toyoura standard sand) and hydrogel (I) were mixed in the predetermined amounts indicated in Table 15. Otherwise, the same procedure as in Example 12 was repeated.

TABLE 14

| Physical and chemical properties of fly ash | |
|---|---|
| Specific gravity: | 2.10 |
| Blaine value: | 3420 cm²/g |
| Unit water amount ratio: | 100% |
| Ignition heat loss: | 1.4% |
| Moisture content: | 0.2% |
| $SiO_2$: | 61.4% |
| $Al_2O_3$: | 24.2% |
| $Fe_2O_3$: | 4.8% |
| CaO: | 2.3% |

For comparison, the above procedure was repeated except that water was used in the same amount as contained in the hydrogel instead of the hydrogel and the pressurizing operation was omitted.

TABLE 13

| Run No. | Hydrogel | Water content (g) | W/C(*) (parts) | Flow value (mm) | Pressure (kg/cm²) | Compression strength (kg/cm²) 7 days | 28 days |
|---|---|---|---|---|---|---|---|
| Invention | | | | | | | |
| 13-1 | (I) | 394 | 25 | No flowing | 100 | 245 | 362 |
| 13-2 | (I) | 551 | 35 | 110 | 20 | 202 | 311 |
| 13-3 | (II) | 394 | 25 | No flowing | 100 | 230 | 345 |
| 13-4 | (III) | 394 | 25 | No flowing | 100 | 241 | 353 |
| 13-5 | (IV) | 394 | 25 | No flowing | 100 | 233 | 358 |
| Comparison | | | | | | | |
| 13-6 | — | 551 | 35 | 120 | A uniform molded product was not obtained, and strength measurement was impossible. | | |
| 13-7 | — | 630 | 40 | 173 | — | 148 | 245 |

(*): Amount of water per 100 parts of (blast furnace slag + cement)

The results are shown in Table 15.

TABLE 15

| Run No. | Hydrogel | Fly ash (g) | Cement (g) | Sand (g) | Amount of water (g) | Amount of fly ash (*1) | Fly ash + cement/sand | W/C + F (*2) | Pressure (kg/cm²) | Compression strength (kg/cm²) 7 days | 28 days |
|---|---|---|---|---|---|---|---|---|---|---|---|
| Invention | | | | | | | | | | | |
| 15-1 | (I) | 750 | 750 | 1500 | 375 | 50 | 1/1 | 25 | 100 | 153 | 272 |
| 15-2 | (I) | 600 | 900 | 1500 | 375 | 40 | 1/1 | 25 | 100 | 202 | 318 |

TABLE 15-continued

| Run No. | Hydro-gel | Fly ash (g) | Cement (g) | Sand (g) | Amount of water (g) | Amount of fly ash (*1) | Fly ash + cement/sand | W/C + F (*2) | Pressure (kg/cm²) | Compression strength (kg/cm²) 7 days | 28 days |
|---|---|---|---|---|---|---|---|---|---|---|---|
| 15-3 | (I) | 600 | 900 | 1500 | 450 | 40 | 1/1 | 30 | 50 | 165 | 279 |
| 15-4 | (I) | 450 | 1050 | 1500 | 375 | 30 | 1/1 | 25 | 100 | 235 | 366 |
| 15-5 | (I) | 450 | 1050 | 1500 | 450 | 30 | 1/1 | 30 | 50 | 191 | 317 |
| Comparison | | | | | | | | | | | |
| 15-6 | — | 600 | 900 | 1500 | 600 | 40 | 1/1 | 40 | — | 95 | 188 |
| 15-7 | — | 450 | 1050 | 1500 | 450 | 30 | 1/1 | 30 | A uniform molded article was not obtained, and strength measurement was impossible. | | |
| 15-8 | — | 450 | 1050 | 1500 | 600 | 30 | 1/1 | 40 | — | 127 | 246 |

(*1): Amount of fly ash: fly ash/(fly ash + cement)
(*2): W/C + F: Amount of water per 100 parts by weight of (fly ash + cement)

The results show that in the present invention, the hydraulic composition can be hardened with a low water content, and the resulting hardened product has very high strength, and that to obtain the same strength, inexpensive fly ash can be incorporated in a great amount to economical advantage.

EXAMPLE 14

Example 1 was repeated except that 1,500 g of blast furnace slag, 375 g of hydrogel (I), 1,500 g of sand and each of the amounts indicated of each of the alkali stimulating agents shown in Table 16 were used as the materials.

For comparison, the above operation was repeated except that water was used in the same amount as contained in the hydrogel instead of the hydrogel and the pressurizing operation was omitted.

The results are shown in Table 16.

The results given in Table 16 show that the hydraulic composition of this invention can be hardened with a low water content even when blast furnace slag is used together with the alkali stimulating agent, and the hardened product obtained has very high strength.

TABLE 16

| Run No. | Hydrogel | Water content (g) | W/C (parts) (*1) | Alkali stimulating agent Type | Amount (parts) (*2) | Flow value (mm) | Pressure (kg/cm²) | Compression strength (kg/cm²) 7 days | 28 days |
|---|---|---|---|---|---|---|---|---|---|
| Invention | | | | | | | | | |
| 16-1 | (I) | 375 | 25 | NaOH | 10 | No flowing | 100 | 233 | 357 |
| 16-2 | (I) | 375 | 25 | Ca(OH)₂ | 5 | No flowing | 100 | 212 | 323 |
| 16-3 | (I) | 375 | 25 | Ca(OH)₂ | 10 | No flowing | 100 | 248 | 360 |
| 16-4 | (I) | 375 | 25 | Al(OH)₃ | 10 | No flowing | 100 | 225 | 320 |
| Comparison | | | | | | | | | |
| 16-5 | — | 375 | 25 | NaOH | 10 | No flowing | A uniform molded product was not obtained, and strength measurement was impossible. | | |
| 16-6 | — | 600 | 40 | NaOH | 10 | 168 | — | 115 | 208 |
| 16-7 | — | 375 | 25 | Ca(OH)₂ | 10 | No flowing | A uniform molded product was not obtained, and strength measurement was impossible. | | |
| 16-8 | — | 600 | 40 | Ca(OH)₂ | 10 | 175 | | 125 | 228 |
| 16-9 | — | 375 | 25 | Al(OH)₃ | 10 | No flowing | A uniform molded product was not obtained, and strength measurement was impossible. | | |
| 16-10 | — | 600 | 40 | Al(OH)₃ | 10 | 170 | | 119 | 215 |

(*1): Amount of water per 100 parts of blast furnace slag
(*2): Amount of the alkali stimulating agent per 100 parts of blast furnace slag

What is claimed is:

1. A process for producing a hardened product comprising:
   mixing
   a hydraulic component,
   an organic hydrogel holding 5 to 1000 times its own weight of water, and
   optionally, aggregate, a reinforcing material selected from the group consisting of pulp fibers, glass fibers, rockwool, resin fibers, carbon fibers and metallic fibers, and other additives selected from the group consisting of binders, air-entraining agents, cement wetting dispersants, expanding agents, water-proofing agents, strength increasing agents, setting accelerators, setting retarders and thickeners together to form a hydraulic composition;
   molding said hydraulic composition by pressurization under a pressure of at least 5 kg/cm² for at least 30 seconds, vibration or application of a centrifugal force; and
   hardening said molded hydraulic composition.

2. The process of claim 1, wherein said molding is carried out by pressurization.

3. The process of claim 1, wherein said hydraulic component is a cement.

4. The process of claim 1, wherein said hydraulic component is gypsum.

5. The process of claim 1, wherein said hydraulic component is blast furnace slag containing an alkali stimulating agent.

6. The process of claim 1, wherein said hydraulic component is fly ash containing an alkali stimulating agent.

7. The process of claim 1, wherein said organic hydrogel is obtained by water absorption of highly water-absorbing polymers selected from the group consisting of starch/acrylonitrile graft copolymer and olefin/maleic anhydride copolymers or obtained by reacting a polycarboxylic acid salt selected from the group consisting of polyacrylic acid salts and olefin/maleic anhydride copolymer salts with a crosslinking agent in the presence of water.

* * * * *